United States Patent [19]
Helder

[11] 3,992,594
[45] Nov. 16, 1976

[54] ECHO SUPPRESSOR BREAK-IN CIRCUITRY

[75] Inventor: George Kenneth Helder, Atlantic Highlands, N.J.

[73] Assignee: Bell Telephone Laboratories, Incorporated, Murray Hill, N.J.

[22] Filed: Oct. 10, 1975

[21] Appl. No.: 621,283

[52] U.S. Cl. .......................................... 179/170.6
[51] Int. Cl.² .......................................... H04B 3/20
[58] Field of Search............ 179/170.2, 170.6, 170.8

[56] References Cited
UNITED STATES PATENTS

| | | | |
|---|---|---|---|
| 3,673,355 | 6/1972 | La Marche et al. ............. | 179/170.6 |
| 3,823,275 | 7/1974 | La Marche et al. ............. | 179/170.2 |
| 3,896,273 | 7/1975 | Fariello............................. | 179/170.6 |

*Primary Examiner*—Kathleen H. Claffy
*Assistant Examiner*—Randall P. Myers
*Attorney, Agent, or Firm*—Donnie E. Snedeker

[57] ABSTRACT

Echo suppressor break-in circuitry must be able to distinguish between double-talking speech on one path of a transmission channel and echos on that one path due to speech on the other path in order that suppression can be removed when both parties are talking. The present disclosure relates to an improved method and arrangement for approximating the echo that may result on an echo return path from speech on another path, which approximation may then be compared with the actual signals on the return path to determine the presence of double-talking speech. In an illustrative embodiment, a first memory store arrangement follows increasing magnitude signals and, during decreasing magnitude signals, provides an output signal corresponding to a predetermined decay rate. A second memory store arrangement follows increasing signals, less a predetermined loss, and holds the magnitude of the last peak while the signal is decreasing. The second memory output is used to approximate echo as long as it is less than the first memory output; otherwise, the first memory output is used.

17 Claims, 3 Drawing Figures

FIG. I

ECHO SUPPRESSOR BREAK-IN CIRCUITRY

BACKGROUND OF THE INVENTION

This invention relates to echo suppressors for two-way transmission systems and, more particularly, to improved break-in circuitry for echo suppressors.

Echos are produced in a transmission system whenever an impedance discontinuity or mismatch exists, such as at the junction between a four-wire transmission channel and a two-wire transmission channel. The annoying effects of echos can be reduced by the use of echo suppressor apparatus which essentially operates to disable the echo return path of a subscriber when he is transmitting. Thus, basically an echo suppressor is a voice-operated switching device which may be situated near one end of a four-wire transmission channel. If echos in both directions are to be suppressed by the device, it is commonly referred to as a full echo suppressor; if echos are suppressed in only one direction, the device is referred to as a split echo suppressor.

In a split echo suppressor, for example, the echo suppressor apparatus nearest a particular subscriber end typically functions to disable the transmit, or outgoing, path from that subscriber when signals from the far-end subscriber appear on the receive, or incoming, path. Thus, echos due to incoming signals on the receive path are prevented from returning to the far-end subscriber over the transmit path. Echo suppressor apparatus at the far subscriber end functions in a similar manner to prevent echos from returning to the near-end subscriber when the near-end subscriber is transmitting. A full echo suppressor essentially combines a pair of split echo suppressor essentially combines a pair of split echo suppressors in a single facility located at the near subscriber end, the two split echo suppressors sharing certain of the suppression control circuitry.

During echo suppression in a system utilizing either a full or a split echo suppressor, suppression must be removed from the transmit path when the near-end subscriber breaks in, a condition commonly referred to as double-talking since both subscribers are talking simultaneously. For this purpose, the echo suppressor includes break-in circuitry for distinguishing between speech signals generated on the transmit path by the near-end subscriber, which may be referred to as double-talking speech, and echo signals returning on the transmit path due to far-end subscriber speech signals on the receive path. This may be accomplished, for example, by sampling the signals on the transmit and receive paths and comparing the samples, or representations thereof, to determine their relative magnitudes. If the transmit path signals exceed the receive path signals, it is assumed that the near-end subscriber is transmitting and break-in is effected by removing echo suppression from the transmit path. On the other hand, if the transmit path signals do not exceed the receive path signals it is assumed that the near-end subscriber is not transmitting and the transmit path remains disabled. Similarly, in the case of a full echo suppressor, the break-in circuitry functions to remove suppression from the near-end receive path when the far-end subscriber breaks in.

A problem in distinguishing between echo and double-talking speech arises from the end delay of the echo in traveling from one transmission path to the other, e.g., from the receive path within the echo suppressor to the transmit path thereof. This end delay may be on the order of 25 milliseconds around the near subscriber end and, in the case of a full echo suppressor, up to 75 milliseconds around the far subscriber end. Thus, in known analog echo suppressors the samples from the one path are typically delayed, or stretched, to compensate for end delay before comparison with the samples from the echo return path. This may be accomplished by a simple lowpass RC filter arrangement, for example, and has been generally effective in suppressing echos. Similar digital arrangements have been proposed for use in digital echo suppressors. However, this approach does not produce a very accurate approximation of the anticipated echo and often results in an undesirable amount of clipping of a subscriber's speech signals, particularly if he speaks softly. Consequently, it would be desirable to improve the accuracy of the echo signal approximations which, in turn, would improve the speed and accuracy with which break-in can be effected so as to reduce excessive clipping of a subscriber's speech signals.

SUMMARY OF THE INVENTION

It is therefore a general object of the present invention to improve the break-in performance of echo suppressors, particularly digital echo suppressors.

A more specific object of the invention is to provide a simple and inexpensive break-in method and arrangement for approximating echo that may result on one transmission path from speech signals on another transmission path.

In an illustrative embodiment of an echo suppressor according to my invention, an accurate approximation of anticipated transmission channel echo is generated by an arrangement using a pair of memory stores, each for storing a single signal sample. One memory store follows increasing magnitude signals and during decreasing magnitude signals provides an output corresponding to a predetermined decay rate reflecting the anticipated (or worst case) echo end delay and return loss for the particular transmission facility. The other memory store follows increasing magnitude signals, less a predetermined loss to reflect the anticipated echo return loss for the transmission facility, and holds the value of the last signal peak while the signal magnitude is decreasing. The output of the other memory store is used to approximate echo as long as that output is less than the output of the one memory store; otherwise, the one memory store output is used. The resulting echo signal approximations thus follow increasing magnitude signals less a predetermined loss and, during decreasing magnitude speech signals, decay at a predetermined rate. Comparison of the thus generated signal approximations with the actual signals appearing on the echo return path permits accurate double-talking speech detection, and thus break-in, without excessive clipping and with greater ease than existing arrangements. The improved break-in characteristics in turn permit the usual break-in hangover time to be reduced, thereby reducing the amount of echo return after double-talking has ceased.

BRIEF DESCRIPTION OF THE DRAWING

The above and other objects, features and advantages of the invention may be fully apprehended from the following detailed description and the accompanying drawing in which.

DETAILED DESCRIPTION

Figure 1:
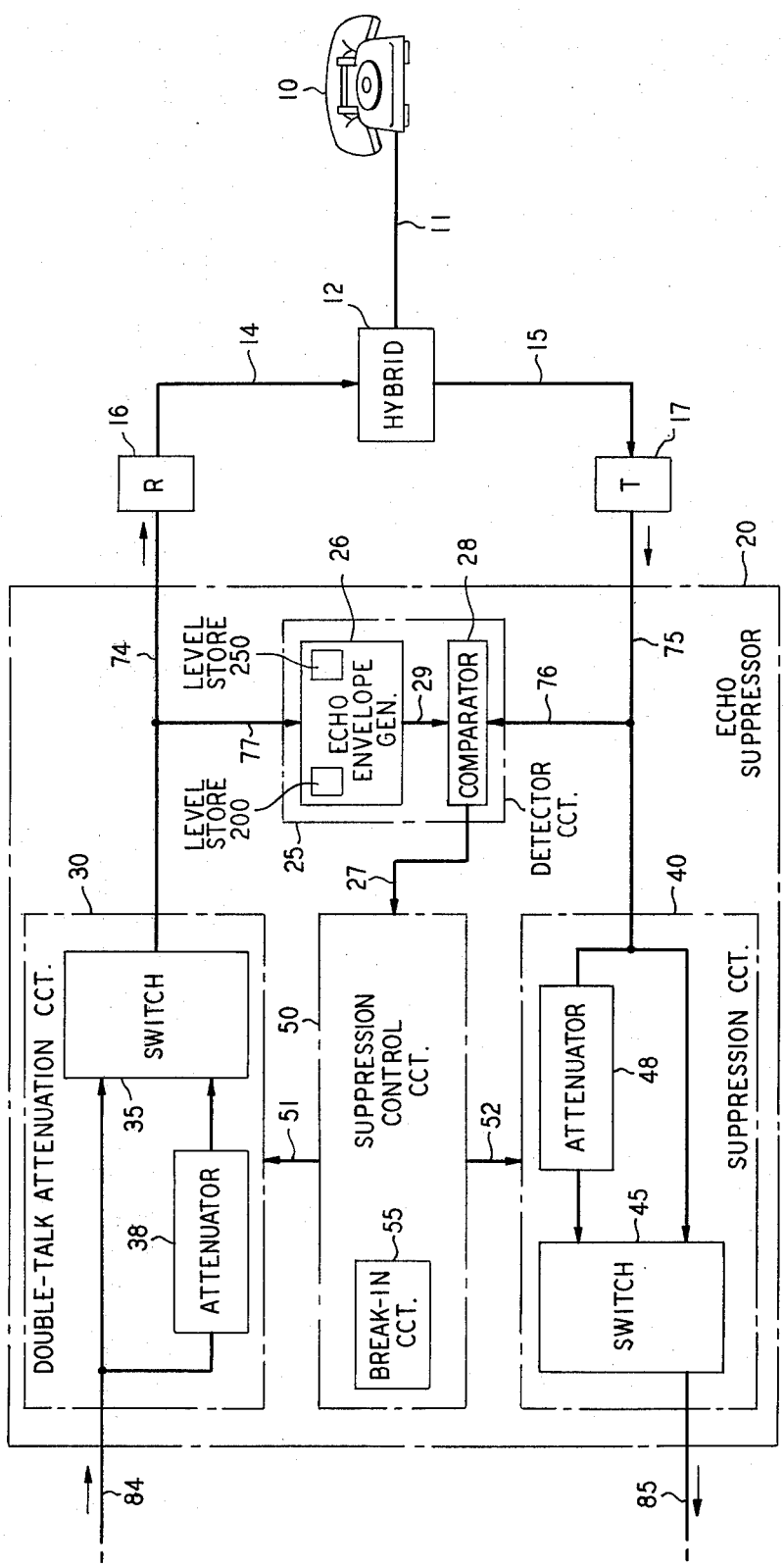
FIG. 1 is a functional block diagram of an illustrative split echo suppressor embodiment in accordance with the invention.

The block diagram in FIG. 1 depicts a typical transmission system in which an echo suppressor in accordance with my invention may be employed, namely, a two-way transmission system including a four-wire transmission channel and a two-wire transmission channel. Subscriber terminal 10, referred to herein as the near-end subscriber, is connected to the four-wire channel by two-way circuit 11 and hybrid network or its equivalent 12. Extending from hybrid 12 are a pair of one-way transmission paths 14 and 15 associated respectively with receiver 16 and transmitter 17. The four-wire transmission channel, depicted as a pair of two-wire paths, may comprise a pair of carrier channels, a pair of one-way radio paths or other one-way transmission channels for interconnecting subscriber terminals. Digital transmission may be assumed over the four-wire channel and thus receiver 16 and transmitter 17 function in the usual fashion for converting between analog signals on the two-wire channel and corresponding digital code words on the four-wire channel. Furthermore, as is well known, receiver 16 and transmitter 17 may comprise parallel-to-serial and serial-to-parallel conversion circuitry, if desired for a particular facility, or such conversion circuitry may be included within echo suppressor 20. Similar circuitry may be included also in incoming and outgoing paths 84 and 85.

Echo suppressor 20, connected in circuit with the four-wire transmission channel, is commonly referred to as a split echo suppressor since it operates to suppress echos in only one direction over the channel. A similar echo suppressor (not shown) may be located at the far subscriber end for suppressing echos in the other direction over the transmission channel. A variety of echo suppressor arrangements for providing the broad functions of echo suppression, break-in and double-talking attenuation as depicted in the block diagram of FIG. 1 are well known and described in detail in the art. See, for example, R. E. LaMarche-C. J. May, Jr., U.S. Pat. No. 3,673,355, issued June 27, 1972 and U.S. Pat. No. 3,823,275, issued July 9, 1974. Consequently, the description of these arrangements herein will be limited to that believed necessary for a complete understanding of the present invention.

Echo suppressor 20 comprises detector circuit 25, suppression control circuit 50 and suppression circuit 40 for interrupting or disabling speech transmission over outgoing path 85 when signals from the far end appear on incoming path 84, thereby preventing echos due to incoming signals on path 84 from returning to the far end subscriber terminal over path 85. The echo suppressor at the far end functions similarly to prevent echos from returning on path 84 when near-end subscriber 10 is transmitting over outgoing path 85.

In common with prior art echo suppressors, detection circuit 25 examines the incoming and outgoing signals to determine when near-end subscriber 10 is transmitting, when the far-end subscriber is transmitting, and when both subscribers are transmitting. As discussed in detail below, detector circuit 25 includes echo envelope generator 26 comprising a pair of level stores 200 and 250 for accurately approximating the echo signals that may appear on the outgoing path due to speech signals from the far-end subscriber on incoming path 84. The echo signal approximations are then extended over path 29 and compared, via comparator 28, with the actual signals appearing on the outgoing (echo return) path to determine whether the latter contain near-end subscriber speech. Based on this determination, detector circuit 25 directs a corresponding indication over path 27 to suppression control circuit 50 which takes appropriate action. If the far-end subscriber is determined to be transmitting and near-end subscriber 10 is not, for example, control circuit 50 disables speech transmission over outgoing path 85 by extending a suppression enabling signal over path 52 to suppression circuit 40. Responsive to the suppression enabling signal, switch 45 operates to extend to outgoing path 85 the signals appearing on path 75 through attenuator 48. Attenuator 48 and switch 45 effectively disable speech transmission over outgoing path 85, such as by digitally attenuating signals on path 75 to a level below the threshold of hearing. In the absence of suppression, on the other hand, outgoing signals on path 75 are extended through switch 45 directly to outgoing path 85.

During echo suppression, i.e., while speech transmission over path 85 is disabled by circuit 40 to suppress echos, near-end subscriber 10 may start transmitting. Simultaneous transmission in both directions is permitted, of course, and is effected by operation of break-in circuit 55 in suppression control circuit 50. When subscriber 10 starts transmitting, detector circuit 25 indicates to suppression control circuit 50 that both subscribers are transmitting, i.e., that a double-talking situation exists. Break-in circuit 55 responds by causing the suppression enabling signal to be removed from path 52, thereby reestablishing the direct outgoing signal path through switch 45 from path 75 to path 85. At the same time, break-in circuit 55 causes an enabling signal to be extended over path 51 to double-talk attenuation circuit 30. Attenuation circuit 30 is provided to help reduce echos in the situation where both parties are talking to one another simultaneously and normal echo suppression cannot be used. Responsive to the enabling signal on path 51, switch 35 in suppression circuit 30 operates to connect double-talk attenuator 38 in circuit with incoming path 84.

Should one of the two subscribers subsequently cease transmitting, detector circuit 25 provides an indication thereof to initiate termination of the break-in state. For example, if subscriber 10 ceases transmitting while the far-end subscriber continues transmitting, detector circuit 25 indicates that condition over path 27 to control circuit 50. After a hangover time interval break-in circuit 55 responds by removing the enabling signal from path 51, thereby disconnecting attenuator 38 from the incoming transmission path. At the same time, control circuit 50 extends a suppression enabling signal over path 52 to suppression circuit 40, operating switch 45 to reconnect attenuator 48 in the outgoing transmission path for echo suppression.

Figure 2:
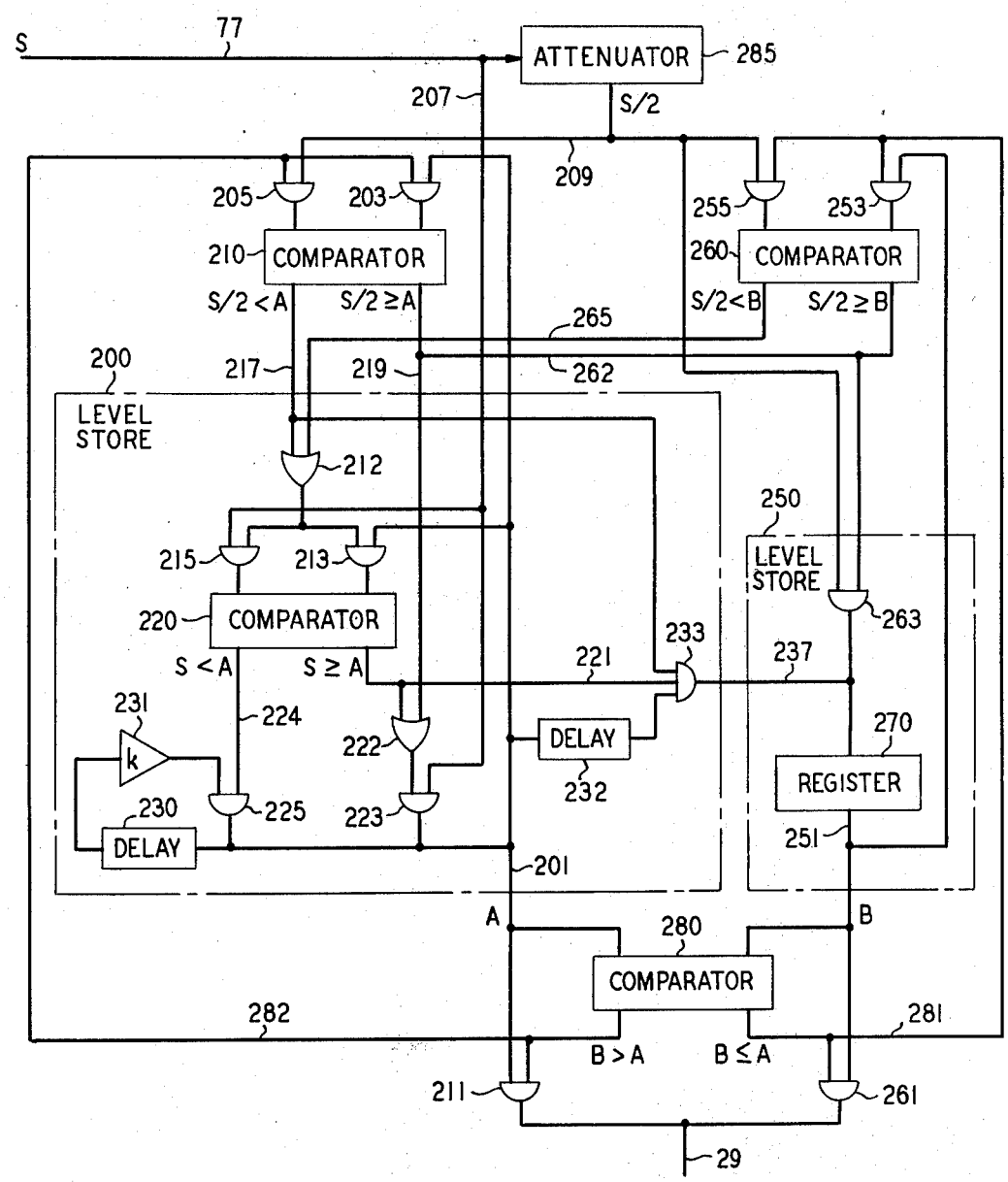
FIG. 2 shows a portion of the detector circuit of FIG. 1 in greater detail.

An illustrative embodiment of echo envelope generator 26 is shown in greater detail in FIG. 2. Level stores 200 and 250 each have the capacity to store a single signal sample, or representation thereof, and extends the stored sample or representation over respective output leads 201 and 251 to level store output comparator 280. The operation of generator 26 in generating echo signal approximations on path 29 is basically to follow and hold increasing signal magnitudes on incoming path 74, less a predetermined loss to reflect the anticipated echo return loss for the particular transmission facility, and during decreasing signal magnitudes to provide an output which decays at a predetermined rate reflecting the anticipated echo end delay and return loss for the transmission facility. Thus, store 250 provides an output on path 251 which follows increasing magnitude incoming signals extended over path 77, less the predetermined loss of attenuator 285, and which holds the value of the last attenuated signal peak while the incoming signal magnitude is decreasing. At the same time, store 200 provides an output on path 201 which follows increasing incoming signal magnitudes and which decays at a predetermined rate, illustratively 6 dB/25 milliseconds, during decreasing signal magnitudes. The output of store 250 is extended through gate 261 to path 29 as long as it is less than the output of store 200; otherwise, the output of store 200 is extended to path 29 through gate 211.

More particularly, successive input signal samples S on path 77 are extended directly over path 207 to store 200 and through attenuator 285 over path 209 to store 250. Attenuator 285 attenuates signal S to one-half magnitude (i.e., S/2) on path 209 to reflect the anticipated echo return loss, illustratively on the order of 6 dB. The successive signal samples S on path 207 are extended via gate 213 to comparator 220 for comparison with output signal A of level store 200. The attenuated signals S/2 on path 209 are extended via gates 205 and 255 to comparators 210 and 260 for comparison with output signals A and B, respectively, of stores 200 and 250. Output signals A and B are directed over respective paths 201 and 251 to comparator 280 to determine which output signal should be extended to path 29.

Level store 200 may be thought of as a recirculating memory which is updated through gate 223 by successive samples S on path 207 for increasing magnitude incoming signals, providing corresponding output signal A on path 201. During decreasing magnitude incoming signals, gate 223 is disabled and output signal A recirculates through gate 225 and decays at a rate determined by delay 230 and decrementing circuit 231. For example, assuming 8000 incoming signal samples per second on path 77 and assuming a one sample delay provided by delay 230, the decrementing factor $k$ of circuit 231 will be on the order of 0.9965 to reduce output signal A by one-half (i.e., 6 dB) in 25 milliseconds.

Level store 250 comprises register 270 for storing a signal magnitude which is updated through gate 263 by successive attenuated samples S/2 on path 209 for increasing magnitude incoming signals, providing corresponding output signal B on path 251. During decreasing magnitude incoming signals, gate 263 is disabled and the signal magnitude stored in register 270 is normally held. However, if the magnitude of output signal A falls below that of output signal B, register 270 is set to the magnitude of output signal A through gate 233, provided the current incoming signal sample on path 77 is greater than but less than twice the magnitude of output signal A.

Figure 3:
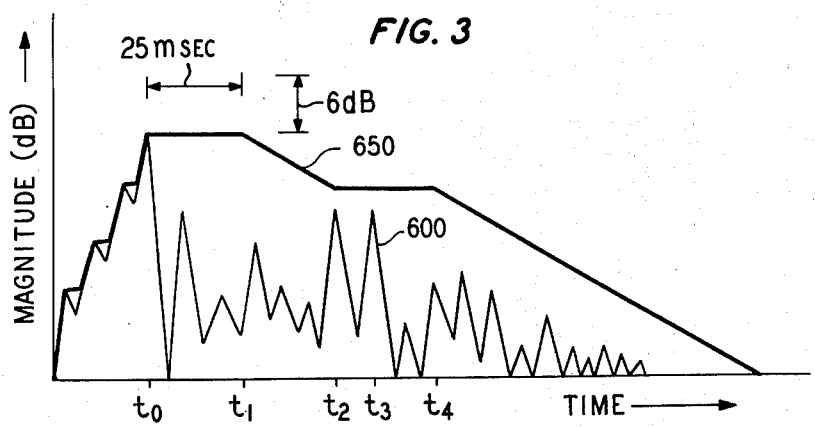
FIG. 3 depicts illustrative waveforms useful in describing the operation of the detector circuit in FIG. 2.

For the following description of the operation of generator 26 reference may be made to the illustrative waveforms in FIG. 3. The waveform 600 depicts an analog signal magnitude envelope represented by a succession of incoming signal samples, or encoded representations thereof, extended over path 77. Waveform 650 depicts the corresponding echo signal magnitude envelope generated in analog or digitally encoded form on path 29 in response to the incoming signals on path 77. The magnitude of waveform 600 is shown attenuated 6 dB to reflect the anticipated echo return loss and thus it corresponds to the attenuated signals S/2 on path 209. Consequently, the echo which may result from the incoming signals on path 77 can be visualized by shifting attenuated waveform 600 to the right 25 milliseconds in FIG. 3 to reflect the anticipated echo end delay.

Initially, stores 200 and 250 may be assumed to be empty, with corresponding identical output signals A and B on paths 201 and 251. Comparator 280 provides an indication thereof on lead 281, enabling gates 253 and 255. The first incoming signal sample appearing on path 77 is extended through attenuator 285 over path 209 through enabled gate 255 to one input of comparator 260. Output signal B on path 251 is extended through gate 253 to the other input of comparator 260. Since the magnitude of attenuated sample S/2 is greater than output signal B, comparator 260 provides an indication on lead 262 which enables gates 263 and 223, the latter through OR gate 222. The enabling of gate 223 extends the signal sample S on path 207 therethrough to path 201 as the new output signal A of store 200. The enabling of gate 263 similarly extends the attenuated signal S/2 on path 209 through to register 270 and thus to path 251 as the new output signal B of store 250. Output signal A is now greater than output signal B, and comparator 280 continues to enable gates 253 and 255 over lead 281. Comparator 280 also enables gate 261 to extend output signal B therethrough to path 29.

Assuming the magnitude of the second incoming signal sample on path 77 is greater than the first sample, comparator 260 again enables gates 263 and 223 for updating stores 200 and 250 in the manner just described. Consequently, for increasing magnitude incoming signals on path 77 each successive sample S is extended over path 207 through gate 223 to update store 200 and thus output signal A. At the same time, each attenuated signal sample S/2 is extended over path 209 through gate 263 to register 270, updating store 250 and output signal B. This continues until a current incoming signal sample appears on path 77 which, when attenuated, is of lesser magnitude than output signal B. Responsive thereto, comparator 260 enables gates 213 and 215 over lead 265 through OR gate 212. The current signal sample S is extended thereby on path 207 through gate 213 to one input of comparator 220, the other input of which is connected through gate 215 to output signal A on path 201. Based on the comparison, comparator 220 enables gate 225 over lead 224. Output signal A is thus decremented via circuit 231 and extended through gate 225 to path 201 as the new output of store 200. Similarly, for each successive decreasing magnitude incoming signal on path 77, output signal A is decremented via circuit 231. However, the signal magnitude previously registered in store 250 remains unchanged, holding output signal B and thus waveform 650 on path 29 at the attenuated peak value reached, as depicted for example at time $t_0$ in FIG. 3.

If the incoming signal magnitude continues to decrease, or remain less than twice the magnitude of output signal B and less than the magnitude of output signal A, for a period of time greater than the anticipated echo end delay, output signal A will be decremented to a value below output signal B. At this point, comparator 280 disables gates 253, 255 and 261 and provides an indication over lead 282 to enable gates 203, 205 and 211. Enabled gate 211 extends output signal A to path 29, as shown for example at time $t_1$ in FIG. 3. Enabled gates 203 and 205 permit comparison, via comparator 210, of output signal A with successive attenuated incoming signal samples on path 209. So long as the attenuated samples remain less than the magnitude of output signal A, comparator 210 provides an output through OR gate 212 to enable gates 213 and 215, thereby permitting comparison of the incoming signal samples with output signal A via comparator 220. Assuming each successive incoming sample is less than output signal A, comparator 220 enables gate 225 to extend the decremented value of output signal A therethrough on path 201 and thus through gate 211 to path 29.

At time $t_2$ in FIG. 3, the incoming signal is shown as having a magnitude which is greater than output signal A, but which is less than twice the magnitude of signal A (i.e., which is less than 6 dB greater). Recall that the magnitude of waveform 600 is shown attenuated by one-half in FIG. 3. Thus, at time $t_2$ comparators 210 and 220 enable gate 233 via respective 217 and 221, extending output signal A through gate 233 over path 237 to register 270, thereby updating output signal B. Gate 223 is also enabled by comparator 220 over lead 221 through OR gate 222, extending the current sample S to lead 201 as the new output signal A. Delay 232 is provided to insure that the previous value of signal A, rather than the updated value thereof, is extended to register 270. If the incoming signal at time $t_2$ had been equal to or greater than twice the magnitude of output signal A, comparator 210 would have enabled gates 223 and 263, via leads 211 and 262, to update stores 200 and 250 in the manner described above.

In either event, output signal A will be greater than output signal B, and thus comparator 280 enables gate 261 to provide output signal B to path 29. The operation of generator 26 then continues as described above, with register 270 holding the value of signal B extended to path 29 and with output signal A decaying at the 6 dB/25 millisecond rate, until signal A is less than signal B or until an incoming signal sample appears on path 77 which is equal to or greater than twice the magnitude of output signal B.

Should a current incoming signal sample equal or exceed twice the magnitude of held signal B, comparator 260 will provide an indication thereof on lead 262 to update stores 200 and 250 in the manner described above. In the absence of an incoming signal equal to or greater than twice the magnitude of output signal B, signal A will normally decay to a magnitude less than signal B in approximately 25 milliseconds. However, if prior thereto, an incoming signal exceeds the magnitude of decaying signal A, but is less than twice the magnitude of signal A, such as depicted at time $t_3$ in FIG. 3, store 200 will be updated to the current incoming signal magnitude through gate 223. Decrementing of signal A then continues from the updated magnitude, thereby increasing the interval for which signal B is held and extended to path 29. In any event, when output signal A is decremented below output signal B, comparator 280 will again transfer output signal A to path 29, as depicted at time $t_4$ in FIG. 3.

The above-described operation continues, essentially following attenuated peak magnitudes via store 250 during increasing incoming signals and holding the attenuated peak magnitudes during decreasing signals, following increasing signal magnitudes and decaying at a predetermined rate during decreasing signals via store 200, and providing the lesser magnitude output of stores 200 and 250 as the echo approximation of the incoming signals, until there are no more incoming signals appearing on path 77.

What has been described hereinabove is a specific illustrative embodiment of the principles of the present invention. For example, it will be apparent that the teachings of the present invention may be employed readily in either analog or digital echo suppressors. Further, the anticipated end delay and return loss parameters employed in generating echo signal approximations may have fixed values, as in the illustrative embodiment herein, or the values may be varied adaptively in accordance with various parameters of the particular transmission facility. Numerous and varied other arrangements may be described by those skilled in the art without departing from the spirit and scope of the invention.

What is claimed is:
1. A method for generating a signal envelope representation of the echo anticipated on a second path due to speech signals appearing on a first path comprising the steps of:
   a. generating a first waveform which follows said first path signals while said first path signals are increasing in magnitude and which decays at a predetermined rate while said first path signals are decreasing in magnitude,
   b. generating a second waveform which follows and holds increasing magnitudes of said first path signals less a predetermined magnitude loss, and
   c. comparing the magnitudes of said first and second waveforms and using the lesser magnitude thereof to generate said signal envelope.

2. The method of claim 1 wherein said predetermined rate at which said first waveform decays is determined by said predetermined magnitude loss and by an anticipated echo end delay between said first and second paths.

3. The method of claim 2 wherein said predetermined magnitude loss is determined by an anticipated echo return loss between said first and second paths.

4. The method of claim 1 wherein said step a. comprises:
   d. comparing the magnitudes of said first path signals and said first waveform;
   e. increasing the magnitude of said first waveform to the magnitude of said first path signals when said comparison determines the magnitude of said first waveform is less than the magnitude of said first path signals, and
   f. decrementing the magnitude of said first waveform a predetermined amount when said comparison determines the magnitude of said first path signals is less than the magnitude of said first waveform.

5. The method of claim 4 wherein said step b. comprises:
   g. comparing the magnitudes of said first path signals and said second waveform, and h. increasing the magnitude of said second waveform to the magnitude of said first path signals, reduced by said predetermined magnitude loss, when the magnitude of said first path signals reduced by said predetermined magnitude loss is greater than the magnitude of said first waveform.

6. The method of claim 5 comprising the further step of setting the magnitude of said second waveform equal to the magnitude of said first path signals, reduced by said predetermined magnitude loss, when said reduced magnitude is greater than the magnitude of said first waveform.

7. The method of claim 6 comprising the further step of setting the magnitude of said second waveform equal to the magnitude of said first path signals, reduced by said predetermined magnitude loss, when said reduced magnitude is greater than the magnitude of said second waveform.

8. The method of claim 7 wherein said predetermined rate at which said first waveform decays is determined by said predetermined magnitude loss and by an anticipated echo end delay between said first and second paths, and wherein said predetermined magnitude loss is determined by an anticipated echo return loss between said first and second paths.

9. In an arrangement for suppressing echos in a two-way communications system having first and second paths, means responsive to speech signals on said first path for inserting a suppression loss in said second path, and break-in means responsive to double-talking speech signals on said second path for removing said suppression loss, said break-in means including a detector circuit comprising first means for storing a first signal representation which follows rising magnitudes of said first path signals and which decays at a predetermined rate during decreasing magnitudes of said first path signals, second means for storing a second signal representation which follows rising magnitudes of said first path signals less a predetermined loss, and means for comparing said first and second signal representations to generate a signal approximating the anticipated second path echo for said first path signals.

10. The arrangement of claim 9 wherein said second storing means comprises means for holding said second signal representation during decreasing magnitudes of said first path signals.

11. The arrangement of claim 10 wherein said comparing means comprises an output path, and means for directing to said output path the lesser magnitude of said first and second signal representations.

12. The arrangement of claim 11 wherein said predetermined loss is determined according to the loss anticipated for said first path signals in returning as echo on said second path.

13. The arrangement of claim 12 wherein said predetermined decay rate is determined according to said predetermined loss and the delay anticipated for said first path signals in returning as echo on said second path.

14. The arrangement of claim 13 further comprising second means for comparing signals on said comparing means output path with said second path signals.

15. An echo envelope generator for use in an echo suppressor comprising means for receiving input signals, first means for providing a first output signal which follows increasing magnitudes of said input signals and which decays at a fixed rate during decreasing magnitudes of said input signals, second means for providing a second output signal which follows and holds increasing magnitudes of said input signals, said second output signal corresponding to said increasing input signal magnitudes less a predetermined loss, and means for using the lesser magnitude of said first and second output signals to generate an echo envelope corresponding to said input signals.

16. A generator according to claim 15 wherein said predetermined loss is determined according to an anticipated echo loss.

17. A generator according to claim 15 wherein said fixed rate is determined according to said predetermined loss and an anticipated echo delay.

* * * * *